United States Patent
Park et al.

(10) Patent No.: US 12,496,319 B2
(45) Date of Patent: Dec. 16, 2025

(54) **INFLAMMATORY DISEASES, COMPRISING *LACTOBACILLUS SAKEI* CVL-001 STRAIN**

(71) Applicant: INDUSTRY FOUNDATION OF CHONNAM NATIONAL UNIVERSITY, Gwangju (KR)

(72) Inventors: Jong Hwan Park, Gwangju (KR); Dong Yeon Kim, Gwangju (KR)

(73) Assignee: INDUSTRY FOUNDATION OF CHONNAM NATIONAL UNIVERSITY, Gwangju (KR)

( * ) Notice: Subject to any disclaimer, the term of this patent is extended or adjusted under 35 U.S.C. 154(b) by 425 days.

(21) Appl. No.: 17/927,052

(22) PCT Filed: Feb. 1, 2021

(86) PCT No.: PCT/KR2021/001303
§ 371 (c)(1),
(2) Date: Nov. 22, 2022

(87) PCT Pub. No.: WO2021/246610
PCT Pub. Date: Dec. 9, 2021

(65) Prior Publication Data
US 2023/0218687 A1 Jul. 13, 2023

(30) Foreign Application Priority Data
Jun. 1, 2020 (KR) .................. 10-2020-0065710

(51) Int. Cl.
*A61K 35/747* (2015.01)
*A61P 1/00* (2006.01)
*A61P 11/06* (2006.01)
*A61P 17/00* (2006.01)
*A61P 29/00* (2006.01)

(52) U.S. Cl.
CPC ............ *A61K 35/747* (2013.01); *A61P 1/00* (2018.01); *A61P 11/06* (2018.01); *A61P 17/00* (2018.01); *A61P 29/00* (2018.01); *A23V 2200/32* (2013.01); *A23V 2200/324* (2013.01); *A23V 2400/179* (2023.08)

(58) Field of Classification Search
None
See application file for complete search history.

(56) References Cited

U.S. PATENT DOCUMENTS

2019/0224255 A1* 7/2019 Rhee .................. A61K 35/747

FOREIGN PATENT DOCUMENTS

| KR | 10-2012-0100608 A | 9/2012 | |
| KR | 20120100608 A * | 9/2012 | ............ A23L 33/10 |
| KR | 10-1678317 B1 | 11/2016 | |
| KR | 10-1708173 B1 | 2/2017 | |
| KR | 10-1870960 B1 | 6/2018 | |
| WO | WO-2020105894 A1 * | 5/2020 | ........... A61K 35/747 |

OTHER PUBLICATIONS

International Search Report from corresponding PCT Application No. PCT/KR2021/001303, dated May 7, 2021.
Kim, D.-Y. et al.; "Protective effects of Lactobacillus sakei CVL-001 on DSS-induced ulcerative colitis in mice", Korean Association of Laboratory Animal Science, Feb. 2020, poster presentation PS-B-05, p. 119.

* cited by examiner

*Primary Examiner* — Michelle F. Paguio Frising
(74) *Attorney, Agent, or Firm* — Harness, Dickey & Pierce, P.L.C.

(57) ABSTRACT

The present invention relates to a composition for preventing or treating inflammatory diseases, comprising a *Lactobacillus sakei* CVL-001 strain. The composition activates NOD2, which is an inflammation regulator, and exhibits the effects of inhibiting weight loss and improving clinical activity scores (disease activity index; DAI) in an animal model in which ulcerative colitis is induced, and thus the present invention can be effectively used in the prevention, treatment or alleviation of inflammatory diseases.

4 Claims, 13 Drawing Sheets

INFLAMMATORY DISEASES, COMPRISING *LACTOBACILLUS SAKEI* CVL-001 STRAIN

CROSS-REFERENCE TO RELATED APPLICATIONS

This application is a national phase application of PCT Application No. PCT/KR2021/001303, filed on Feb. 1, 2021, which claims priority to Korean Patent Application No. 10-2020-0065710, filed on Jun. 1, 2020. The entire disclosures of the applications identified in this paragraph are incorporated herein by reference.

TECHNICAL FIELD

The present disclosure was made with the support of the Ministry of Science and ICT, Republic of Korea, under project identification No. 1711110294, project No. 2018R1A2B3004143, which was conducted in the research project named "Cell and tissue-specific host defense system mediated by Nod2 against microbial infection" in the research program titled "Personal Basic Research (Ministry of Science and ICT) (R&D)" by Chonnam National University under the management of the National Research Foundation of Korea, from 1 Mar. 2020 to 28 Feb. 2021.

The present disclosure relates to a composition containing *Lactobacillus sakei* CVL-001 strain for preventing or treating an inflammatory disease and, more specifically, to a composition capable of exhibiting activity to prevent, treat, or alleviate an inflammatory disease by using *Lactobacillus sakei* CVL-001 strain.

BACKGROUND ART

Inflammatory bowel disease is a disease that causes chronic inflammation and ulcers in the bowel, with repeated cycles of remission and recurrence, and is known to be mainly caused by an excessive immune response or the like of the body against bacteria normally present in the bowel, along with environmental and genetic factors. Examples of the inflammatory disease include inflammatory bowel diseases, such as ulcerative colitis and Crohn's disease, and these diseases are collectively referred to as inflammatory bowel disease since they are similar in terms of symptom, course of the disease, treatment method, and the like. In recent years, the incidence of inflammatory bowel disease in the relatively young generation corresponding to those in their 20s and 30s in Korea is continuously increasing due to westernization of the modern society and changes in eating habits in Korea.

Inflammatory bowel disease is a chronic disease in which a remission stage, during which symptoms are less severe, and an active stage, during which symptoms are severe, are repeated. Therefore, the purpose of treatment is to improve the quality of the life by controlling symptoms and preventing complications, and an immunosuppressant is a generally frequently used as a drug formulation.

However, such immunosuppressants are reported to cause side effects, such as nausea, heartburn, headache, dizziness, anemia, and skin rashes, in some patients, and in order to reduce these side effects, the development of medicines with few side effects are required.

Recently, next-generation sequencing (NGS) techniques have been developed, and research on the microbiome present in the gut has been activated. In addition, many studies have been reported on the relationship between the pathogenesis of inflammatory bowel disease and the microbiome.

Out of such studies, a lot of studies have been reported in which lactic acid bacteria that play a beneficial role in the bowel show a protective effect on inflammatory bowel disease, but additional studies are needed with respect to a protective effect on inflammatory bowel disease varying depending on the type of lactic acid bacteria.

DISCLOSURE OF INVENTION

Technical Problem

The present inventors confirmed that *Lactobacillus sakei* CVL-001 strain activates NOD2, an inflammation regulatory factor, showed excellent effects of inhibiting the body weight loss and improving the disease activity index (DAI) in an ulcerative colitis-induced mouse model.

Accordingly, an aspect of the present disclosure is to provide a pharmaceutical composition for preventing or treating an inflammatory disease, the pharmaceutical composition containing *Lactobacillus sakei* CVL-001 strain deposited under Accession Number KCTC13816BP.

Another aspect of the present disclosure is to provide a health functional food composition for alleviating an inflammatory disease, the health functional food composition containing *Lactobacillus sakei* CVL-001 strain deposited under Accession Number KCTC13816BP.

Still another aspect of the present disclosure is to provide use of *Lactobacillus sakei* CVL-001 strain for preventing, treating, or alleviating an inflammatory disease.

Solution to Problem

The present disclosure is directed to a composition containing *Lactobacillus sakei* CVL-001 strain for preventing or treating an inflammatory disease, and the composition according to the present disclosure shows a preventing, treating, or alleviating effect in an ulcerative colitis-induced animal model.

The present inventors confirmed that *Lactobacillus sakei* CVL-001 strain activates NOD2, an inflammation regulatory factor, showed excellent effects of inhibiting the body weight loss and improving the disease activity index (DAI) in an ulcerative colitis-induced mouse model.

Actually, NOD2 is an intracellular immunomodulatory protein that induces an immune response. It has been reported that the addition of muramyl dipeptide (MDP), which stimulates the activity of NOD2, in the inflammatory bowel disease alleviates the inflammatory bowel disease, and it has been known that strains with high NOD2 activity among lactic acid bacteria tend to alleviate inflammatory bowel disease.

Hereinafter, the present disclosure will be described in more detail.

In accordance with an aspect of the present disclosure, there is provided a pharmaceutical composition for preventing or treating an inflammatory disease, the pharmaceutical composition containing the *Lactobacillus sakei* CVL-001 strain deposited under Accession Number KCTC13816BP.

The inflammatory disease may be at least one selected from the group consisting of ulcerative colitis, ulcerative duodenitis, Crohn's disease, irritable bowel syndrome, intestinal Behcet's disease, hemorrhagic rectal ulcer, pouchitis, enteritis, ischemic colitis, extra-intestinal manifestations, dermatitis, atopic dermatitis, asthma, conjunctivitis, periodontitis, rhinitis, otitis media, iritis, pharyngitis, tonsillitis, pneumonia, pancreatitis, gastritis, hemorrhoids, gout, ankylosing spondylitis, lupus, fibromyalgia, psoriasis, rheumatoid arthritis, osteoarthritis, osteoporosis, hepatitis, cystitis, nephritis, Sjogren's syndrome, and multiple sclerosis.

The strain may be in a living form, an inactivated form, or a mixture thereof.

The inactivated form may be obtained by killing the strain with heat or radiation and, for example, may be obtained by killing the strain through heat treatment, but is not limited thereto. The strain killed by heat treatment may be understood to be in a state of having only the characteristics of the strain wall.

The pharmaceutical composition may contain the stain at a concentration of $5 \times 10^5$ to $5 \times 10^{11}$, $5 \times 10^5$ to $5 \times 10^{10}$, $5 \times 10^5$ to $5 \times 10^9$, $5 \times 10^6$ to $5 \times 10^{11}$, $5 \times 10^6$ to $5 \times 10^{10}$, $5 \times 10^6$ to $5 \times 10^9$, $5 \times 10^7$ to $5 \times 10^{11}$, $5 \times 10^7$ to $5 \times 10^{10}$, $5 \times 10^7$ to $5 \times 10^9$, $5 \times 10^8$ to $5 \times 10^{11}$, or $5 \times 10^8$ to $5 \times 10^{10}$, and for example, $5 \times 10^8$ to $5 \times 10^9$ CFU/ml, but is not limited thereto.

The pharmaceutical composition of the present disclosure may be used as a pharmaceutical composition containing a pharmaceutically effective amount of the *Lactobacillus sakei* CVL-001 strain and/or a pharmaceutically acceptable carrier.

As used herein, the term "pharmaceutically effective amount" refers to an amount that is sufficient to attain the effect or activity of the aforementioned *Lactobacillus sakei* CVL-001 strain.

The pharmaceutically acceptable carrier contained in the pharmaceutical composition of the present disclosure is conventionally used for preparation of formulations, and examples thereof may include lactose, dextrose, sucrose, sorbitol, mannitol, starch, acacia gum, calcium phosphate, alginate, gelatin, calcium silicate, microcrystalline cellulose, polyvinylpyrrolidone, cellulose, water, syrup, methyl cellulose, methyl hydroxybenzoate, propyl hydroxybenzoate, talc, magnesium stearate, and mineral oils, but are not limited thereto. The pharmaceutical composition of the present disclosure may further contain, in addition to the above ingredients, a lubricant, a wetting agent, a sweetening agent, a flavoring agent, an emulsifier, a suspending agent, a preservative, and the like.

The pharmaceutical composition according to the present disclosure may be administered to mammals including humans through various routes. The manner of administration may be any manner that is conventionally used, and for example, the administration may be conducted through an oral, dermal, intravenous, intramuscular, or subcutaneous route, and preferably, the administration may be conducted through an oral route.

The appropriate dose of the pharmaceutical composition of the present disclosure varies depending on factors, such as the formulating method, the manner of administration, patient's age, body weight, sex, and morbidity, food, the time of administration, the route of administration, the excretion rate, and response sensitivity. An ordinarily skilled practitioner can easily determine and prescribe the dose that is effective for the desired treatment or prevention.

The pharmaceutical composition of the disclosure may be formulated into a unit dosage form or may be prepared in a multi-dose container by using a pharmaceutically acceptable carrier and/or excipient according to a method that can be easily implemented by a person having an ordinary skill in the art to which the present disclosure belongs. The formulation may be in the form of a solution, suspension, or emulsion in an oily or aqueous medium, or in the form of an extract, a powder, granules, a tablet, a capsule, or a gel (e.g., a hydrogel), and may further contain a dispersant or a stabilizer.

In accordance with another aspect of the present disclosure, there is provided a health functional food composition for alleviating an inflammatory disease, the health functional food composition containing the *Lactobacillus sakei* CVL-001 strain deposited under Accession Number KCTC13816BP.

The inflammatory disease may be at least one selected from the group consisting of ulcerative colitis, ulcerative duodenitis, Crohn's disease, irritable bowel syndrome, intestinal Behcet's disease, hemorrhagic rectal ulcer, pouchitis, enteritis, ischemic colitis, extra-intestinal manifestations, dermatitis, atopic dermatitis, asthma, conjunctivitis, periodontitis, rhinitis, otitis media, iritis, pharyngitis, tonsillitis, pneumonia, pancreatitis, gastritis, hemorrhoids, gout, ankylosing spondylitis, lupus, fibromyalgia, psoriasis, rheumatoid arthritis, osteoarthritis, osteoporosis, hepatitis, cystitis, nephritis, Sjogren's syndrome, and multiple sclerosis.

The strain may be in a living form, an inactivated form, or a mixture thereof.

The inactivated form may be obtained by killing the strain with heat or radiation and, for example, may be obtained by killing the strain through heat treatment, but is not limited thereto.

The health functional food composition may contain the stain at a concentration of $5 \times 10^5$ to $5 \times 10^{11}$, $5 \times 10^5$ to $5 \times 10^{10}$, $5 \times 10^5$ to $5 \times 10^9$, $5 \times 10^6$ to $5 \times 10^{11}$, $5 \times 10^6$ to $5 \times 10^{10}$, $5 \times 10^6$ to $5 \times 10^9$, $5 \times 10^7$ to $5 \times 10^{11}$, $5 \times 10^7$ to $5 \times 10^{10}$, $5 \times 10^7$ to $5 \times 10^9$, $5 \times 10^8$ to $5 \times 10^{11}$, or $5 \times 10^8$ to $5 \times 10^{10}$, and for example, $5 \times 10^8$ to $5 \times 10^9$ CFU/ml, but is not limited thereto.

When the health functional food composition of the present disclosure is used as a food additive, the health functional food composition may be added as it is, may be used along with other foods or food ingredients, or may be appropriately used by a conventional method. The health functional food composition of the present disclosure may be generally added at an amount of 15 wt % or less, preferably 10 wt % or less, relative to the raw materials when a food or beverage is manufactured.

The type of food is not particularly limited. Examples of the food to which the above-described materials may be added include meats, sausages, breads, chocolates, candies, snacks, confectioneries, pizzas, ramen, other noodles, gums, dairy products encompassing ice creams, various soups, beverages, teas, drinks, alcoholic beverages, vitamin complexes, and the like, and include all foods in a typical sense.

The beverage may contain, as additive ingredients, various kinds of flavoring agents or natural carbohydrates. The aforementioned natural carbohydrates may include monosaccharides such as glucose and fructose, disaccharides such as maltose and sucrose, natural sweeteners such as dextrin and cyclodextrin, and synthetic sweeteners such as saccharin and aspartame. The proportions of the natural carbohydrates may be appropriately determined by the selection of a person skilled in the art.

In addition to the aforementioned ingredients, the health functional food composition of the present disclosure may contain various types of nutrient supplements, vitamins, electrolytes, flavoring agents, colorants, pectic acid and salts thereof, alginic acid and salts thereof, organic acids, protective colloid thickeners, pH adjusters, stabilizers, preservatives, glycerin, alcohols, carbonizing agents used in carbonated beverages, and the like. In addition, the health functional food composition of the present disclosure may contain flesh for manufacturing natural fruit juices, fruit juice beverages, and vegetable beverages. These ingredients may be used either alone or in combination. The proportions of these ingredients may also be appropriately selected by a person skilled in the art.

The health functional food may be selected from the group consisting of capsules, tablets, powders, granules, liquids, pills, syrups, and bars.

Advantageous Effects of Invention

The present disclosure is directed to a composition containing *Lactobacillus sakei* CVL-001 strain for preventing or treating an inflammatory disease, wherein the composition activates NOD2, an inflammation regulatory factor, shows excellent effects of inhibiting the body weight loss and improving the disease activity index (DAI) in the ulcerative colitis-induced mouse model, and thus the composition can be effectively used in the prevention, treatment, or alleviation of an inflammatory disease.

BEST MODE FOR CARRYING OUT THE INVENTION

The present disclosure is directed to a pharmaceutical composition for preventing or treating an inflammatory disease, the pharmaceutical composition containing the *Lactobacillus sakei* CVL-001 strain deposited under Accession Number KCTC13816BP.

MODE FOR CARRYING OUT THE INVENTION

Hereinafter, the present disclosure will be described in more detail by the following examples. However, these exemplary embodiments are used only for illustration, and the scope of the present disclosure is not limited by these exemplary embodiments.

Throughout the present specification, the "%" used to express the concentration of a specific material, unless otherwise particularly stated, refers to (wt/wt) % for solid/solid, (wt/vol) % for solid/liquid, and (vol/vol) % for liquid/liquid.

Example 1: NOD2 Activity Level by *Lactobacillus sakei* CVL-001 Strain

Existing literature has reported that the protective effect of lactic acid bacteria on inflammatory bowel disease results from the anti-inflammatory effect of NOD2, which is an innate immune receptor protein. Therefore, it was investigated whether several types of lactic acid bacteria derived from kimchi had an ability to stimulate NOD2 in HEK293T cells.

Specifically, HEK293 cells were treated with 1 MOI of several types of lactic acid bacteria, which had been transduced to generate luciferase by transcription of the luciferase gene through the stimulation of NOD2. For a control with respect to cell activity, HEK293 cells were treated with 10 ng/ml muramyl dipeptide (MDP) capable of stimulating NOD2 and then cultured in a cell incubator for 24 hours. Thereafter, the NOD2 activity was determined by luciferase assay on the luciferase generated from cell rupture. MDP, which is a component of the peptidoglycan constituting the cell wall of bacteria, is a ligand that directly acts on NOD2, and this was used as a control.

TABLE 1

| Strain | — | MDP | *Lactobacillus curvatus* | *Lactobacillus plantrum* | *Lactobacillus paracasei* | *Lactobacillus brevis* | *Lactobacillus graminis* | *Lactobacillus sakei* CVL-001 |
|---|---|---|---|---|---|---|---|---|
| NOD2 Activity | 1.00 | 40.70 | 4.11 | 4.01 | 1.39 | 0.83 | 3.64 | 23.63 |

Figure 1:
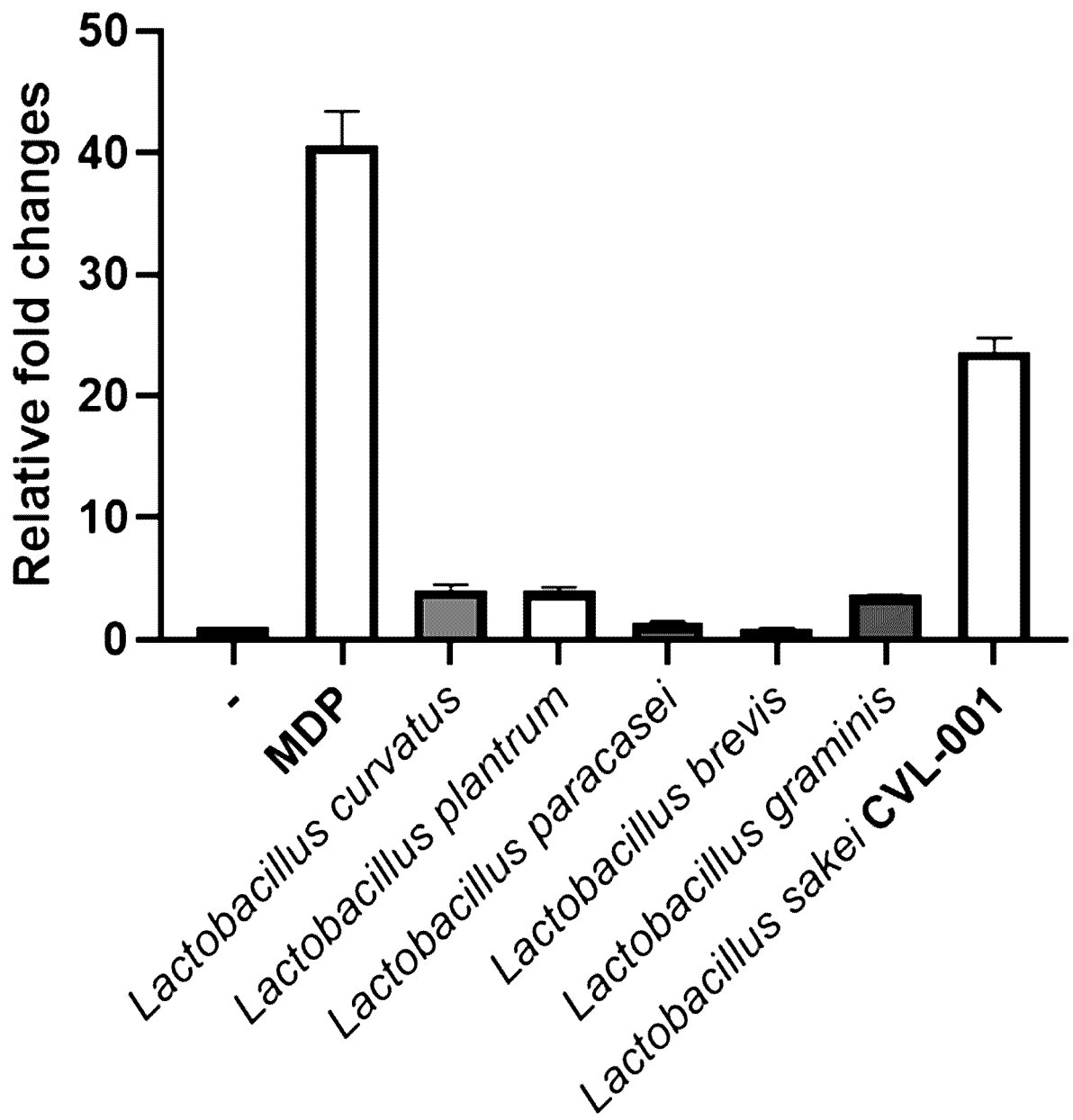
FIG. 1 is a graph comparing NOD2 activity levels by various types of lactic acid strains.

As can be confirmed from Table 1 and FIG. 1, the *Lactobacillus sakei* CVL-001 strain showed the highest level in NOD2 activity, and therefore, the *Lactobacillus sakei* CVL-001 strain was used for tests since the strain was predicted to exhibit a protective effect on inflammatory bowel disease.

Example 2: Culture of *Lactobacillus sakei* CVL-001

The *Lactobacillus sakei* CVL-001 strain was inoculated (by streaking) on MRS agar medium, a selective medium for lactic acid bacteria, and cultured in a 30° C. bacterial incubator for 24 hours. Thereafter, single colonies were extracted and suspended in MRS broth, and the MRS broth thus obtained were pre-cultured for 12 to 16 hours in a bacterial incubator under conditions of 30° C. and 150 rpm.

To obtain fresh bacteria, the pre-cultured bacteria were subjected to main culturing in fresh MRS broth for 2 to 3 hours by using a bacterial incubator under conditions of 30° C. and 150 rpm. The main-cultured bacteria were centrifuged at 3000 rpm for 15 minutes using a centrifuge, and the centrifuged bacteria were washed with phosphate buffer saline (PBS), followed by quantification through absorbance measurement. The quantified bacteria were used, along with PBS as a solvent, by the administration to mice.

Example 3: Ulcerative Colitis Mouse Model Construction (1)

Figure 2:
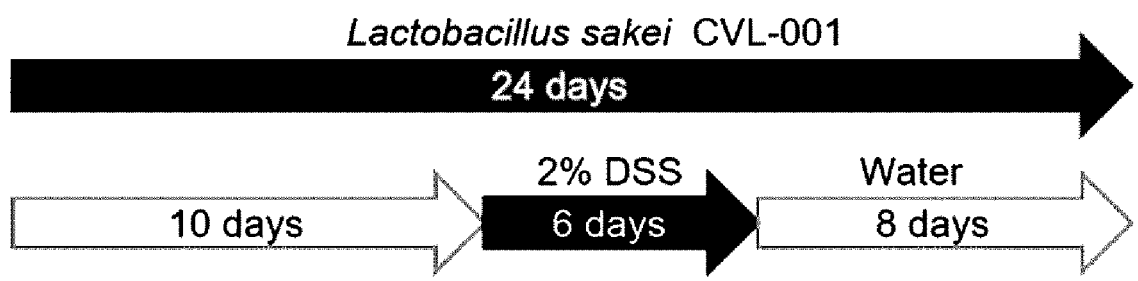
FIG. 2 is a schematic diagram showing a schedule of constructing an ulcerative colitis mouse model through feeding of dextran sodium sulfate (DSS) to mice.

It is known that the feeding of dextran sodium sulfate (DSS) to mice usually causes inflammatory bowel disease, similar to ulcerative colitis in humans, followed by changes in body weight, clinical symptoms, colon length, and the like. Therefore, an ulcerative colitis mouse model was constructed by DSS feeding as shown in FIG. 2.

Specifically, 54 C57BL/6J mice aged 7 weeks were grouped into six. To reduce the variation between groups, the mice were divided as follows such that the average body weight was constant.

Group 1: water feeding (non-disease)+PBS
Group 2: water feeding+$10^9$ CFU of *Lactobacillus sakei* CVL-001 (high concentration of lactic acid bacteria)
Group 3: DSS feeding (disease)+PBS
Group 4: DSS feeding+$10^7$ CFU of *Lactobacillus sakei* CVL-001 (low concentration of lactic acid bacteria)
Group 5: DSS feeding+$10^8$ CFU of *Lactobacillus sakei* CVL-001 (medium concentration of lactic acid bacteria)
Group 6: DSS feeding+$10^9$ CFU of *Lactobacillus sakei* CVL-001 (high concentration of lactic acid bacteria)

The number of mice in each group was 9. The mice were acclimatized for 7 days, and then orally administered the *Lactobacillus sakei* CVL-001 strain at 200 μl per individual once a day for 10 days. The mice were fed with water ad libitum, obtained by dissolving DSS in sterile tap water to 2%, for six days from the 10th day, and then, the recovery pattern was observed while the mice were fed with only sterile tap water ad libitum. The lactic acid bacteria were continuously administered until the test ended.

Example 4: Protective Effect of *Lactobacillus sakei* CVL-001 Strain on Ulcerative Colitis-Induced Mice 4-1. Changes in Body Weight and Disease Activity Index The ulcerative colitis-induced mice of Example 3 were administered the *Lactobacillus sakei* CVL-001 strain and measured for the body weight change (unit: %) and the change in disease activity index (DAI) indicating the extent of colitis. The results showed that the mice were recovered in proportion to the concentration of administration.

TABLE 2

| Day | PBS | *L. sakei* ($10^9$ CFU) | DSS + PBS | DSS + *L. sakei* ($10^7$ CFU) | DSS + *L. sakei* ($10^8$ CFU) | DSS + *L. sakei* ($10^9$ CFU) |
|---|---|---|---|---|---|---|
| 0 | — | — | — | — | — | — |
| 1 | 1.02 | 0.10 | 1.26 | −0.14 | −1.73 | 0.65 |
| 2 | 1.38 | −0.69 | 2.65 | 0.38 | −1.72 | 1.61 |
| 3 | 3.57 | 0.94 | 2.52 | 1.84 | 0.13 | 3.94 |
| 4 | 5.53 | 3.55 | 3.85 | 3.02 | 3.28 | 4.84 |
| 5 | 4.16 | 4.27 | 1.37 | 1.10 | 0.82 | 1.87 |
| 6 | 4.78 | 3.36 | −3.08 | −4.81 | −4.38 | −2.51 |
| 7 | 5.62 | 3.02 | −11.61 | −11.23 | −10.78 | −8.80 |
| 8 | 5.75 | 3.60 | −16.07 | −15.90 | −16.16 | −12.81 |
| 9 | 6.10 | 4.05 | −19.49 | −18.69 | −19.09 | −15.99 |
| 10 | 5.60 | 4.50 | −22.14 | −20.37 | −19.91 | −16.54 |
| 11 | 7.15 | 5.06 | −22.26 | −18.55 | −17.26 | −15.32 |
| 12 | 7.88 | 4.81 | −20.38 | −13.83 | −12.03 | −9.59 |
| 13 | 6.17 | 3.32 | −16.74 | −11.00 | −7.66 | −6.41 |
| 14 | 8.21 | 4.03 | −15.24 | −9.29 | −5.17 | −2.69 |

Figure 3:
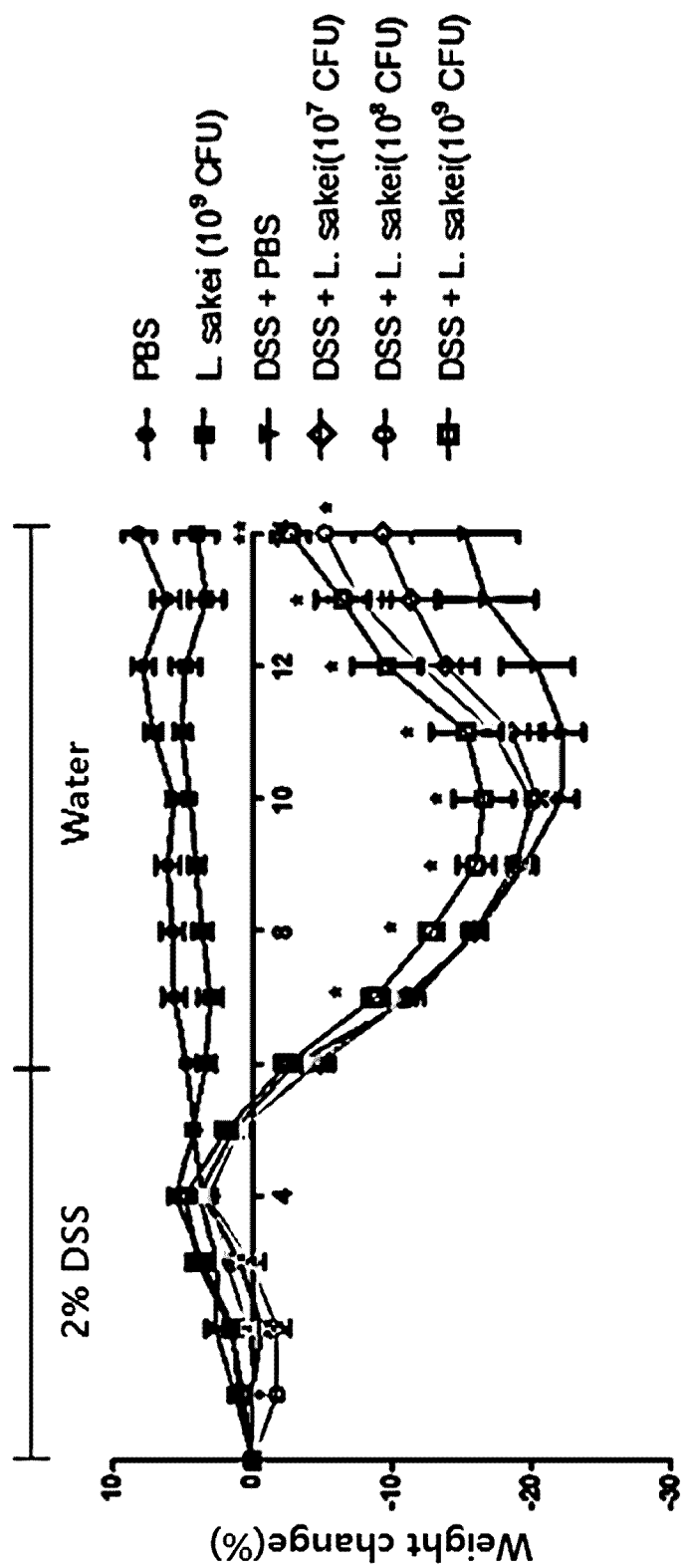
FIG. 3 is a graph showing body weight changes by the feeding of *Lactobacillus sakei* CVL-001 strain in ulcerative colitis-induced mouse individuals.

As can be confirmed in FIG. 3 and Table 2, the feeding of DSS to the mice caused diarrhea and bloody stools, resulting in weight loss of individuals. However, the body weight of the individuals was recovered in a concentration-dependent manner in the groups fed with the lactic acid bacteria. Especially, the degree of weight loss by DSS was relatively reduced and the recovery rate was also significantly increased in the high concentration administration group ($10^9$ CFU/mice) compared with the other groups.

TABLE 3

| Day | PBS | *L. sakei* ($10^9$ CFU) | DSS + PBS | DSS + *L. sakei* ($10^7$ CFU) | DSS + *L. sakei* ($10^8$ CFU) | DSS + *L. sakei* ($10^9$ CFU) |
|---|---|---|---|---|---|---|
| 0 | — | — | — | — | — | — |
| 1 | 0.00 | 0.00 | 0.00 | 0.00 | 0.00 | 0.00 |
| 2 | 0.00 | 0.00 | 0.00 | 0.00 | 0.00 | 0.00 |
| 3 | 0.00 | 0.00 | 0.00 | 0.00 | 0.00 | 0.00 |
| 4 | 0.00 | 0.00 | 1.17 | 1.61 | 1.50 | 0.78 |
| 5 | 0.00 | 0.00 | 2.56 | 3.89 | 2.89 | 3.11 |
| 6 | 0.00 | 0.00 | 7.22 | 8.33 | 7.00 | 6.56 |
| 7 | 0.00 | 0.00 | 6.89 | 5.72 | 5.33 | 5.11 |
| 8 | 0.00 | 0.00 | 6.89 | 5.83 | 6.17 | 5.56 |
| 9 | 0.00 | 0.00 | 6.56 | 6.17 | 6.50 | 5.89 |
| 10 | 0.00 | 0.00 | 6.72 | 5.56 | 5.89 | 5.00 |
| 11 | 0.00 | 0.00 | 5.50 | 4.67 | 4.67 | 4.61 |
| 12 | 0.00 | 0.00 | 5.72 | 5.22 | 5.11 | 4.44 |
| 13 | 0.00 | 0.00 | 5.17 | 4.17 | 4.00 | 3.39 |
| 14 | 0.00 | 0.00 | 3.39 | 2.33 | 2.00 | 1.22 |

Figure 4:
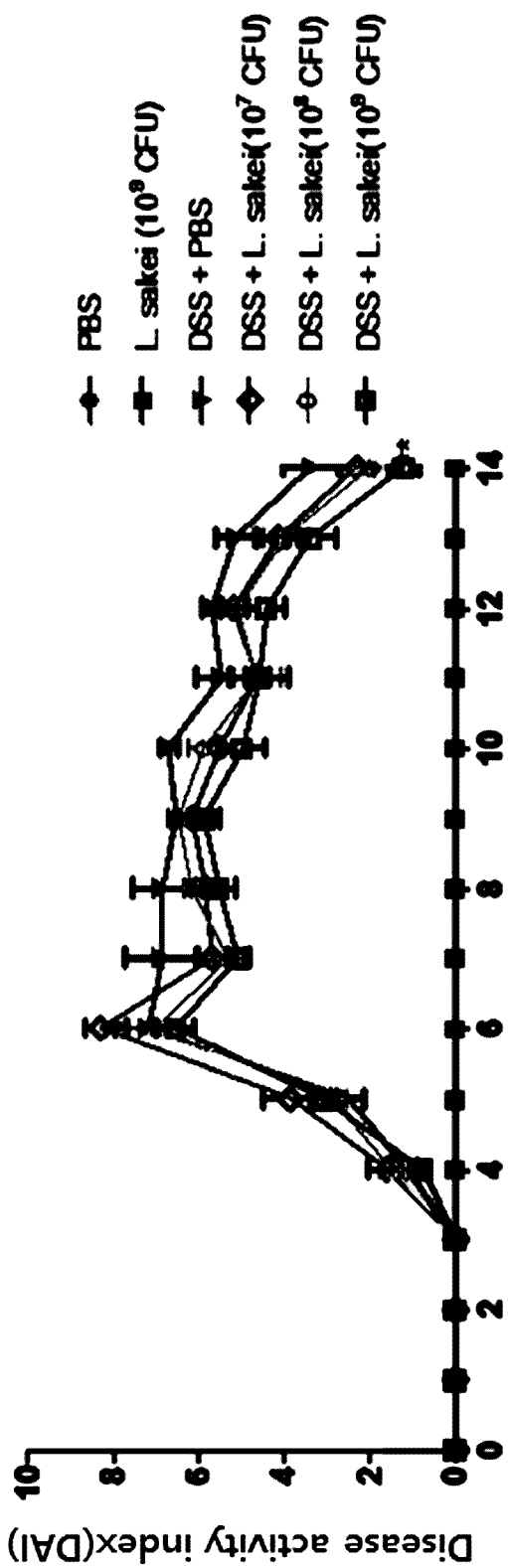
FIG. 4 is a graph showing changes in disease activity index (DAI) by the feeding of *Lactobacillus sakei* CVL-001 strain in ulcerative colitis-induced mouse individuals.

As can be confirmed in FIG. 4 and Table 3, the disease activity index of the mouse individuals, which was determined by observing the change of body weight, the state of stools, and the extent of bloody stool, were recovered.

Therefore, the protective effect of the *Lactobacillus sakei* CVL-001 strain on inflammatory bowel disease could be confirmed.

4-2. Changes in Colon Length and Histologic Score Index Recovery

Previous studies have reported that the colon length was shortened in groups fed with DSS when mouse organs were observed through autopsy. In a case where DSS causes damage to the colonic epithelium and disrupts the integrity of the epithelium, the in-vivo system, for recovery, induces an action to improve the integrity of the epithelium through various recovery mechanisms, such as fibrosis. Such an action shortens the overall colon length, and thus, the extent of damage to the colonic epithelium can be evaluated from the shortening of the colon length.

The groups administered the lactic acid bacteria were measured for colon length and investigated for the change in histologic scoring index by examination of the epithelium integrity and inflammatory cell invasion.

TABLE 4

| Day | PBS | L. sakei ($10^9$ CFU) | DSS + PBS | DSS + L. sakei ($10^7$ CFU) | DSS + L. sakei ($10^8$ CFU) | DSS + L. sakei ($10^9$ CFU) |
|---|---|---|---|---|---|---|
| Colon length (mm) | 77.22 | 77.00 | 54.22 | 62.00 | 60.56 | 64.67 |

Figure 5:
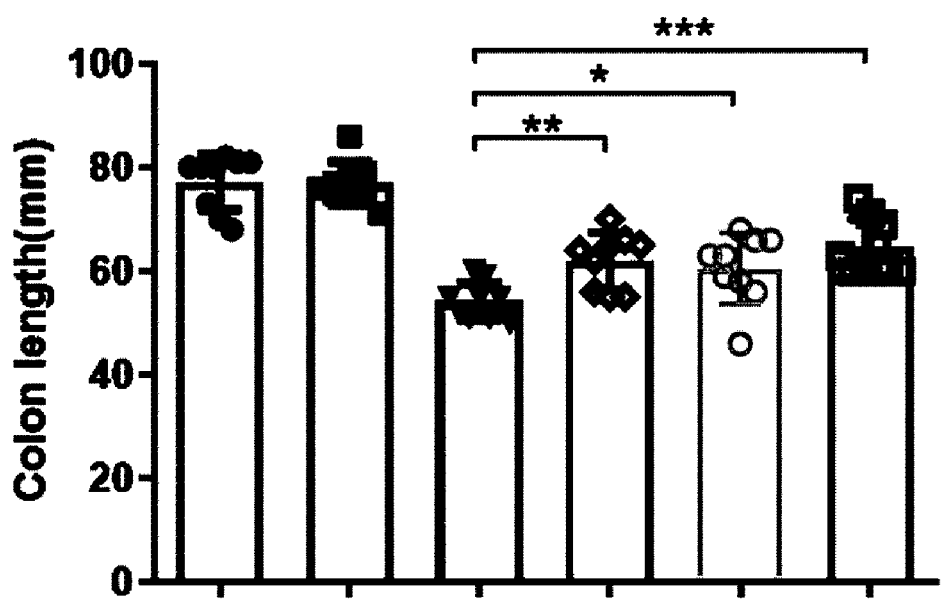
FIG. 5 is a graph showing changes in colon length by the feeding of *Lactobacillus sakei* CVL-001 strain in ulcerative colitis-induced mouse individuals.
Figure 5:
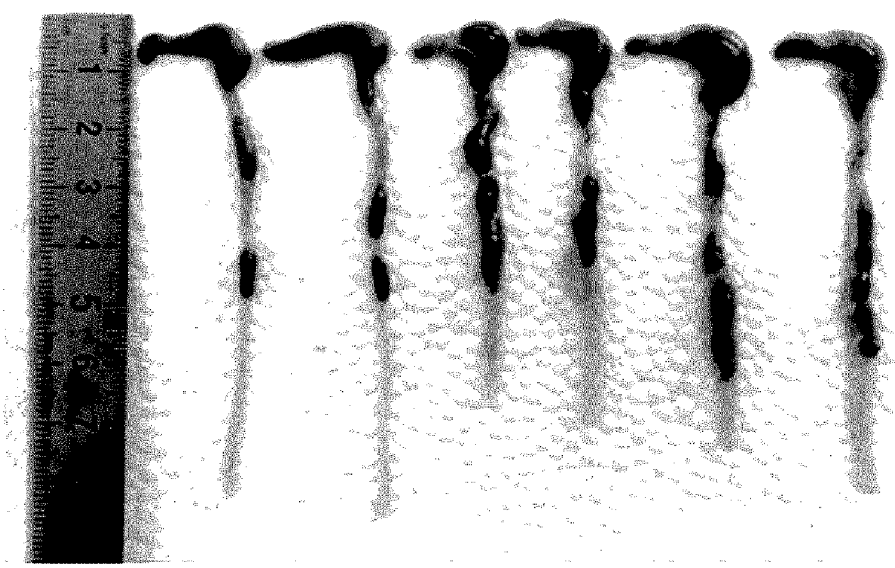

As can be confirmed in Table 4 and FIG. 5, the colon length was recovered in a concentration-dependent manner, according to the amount of administration of *Lactobacillus sakei* CVL-001 strain, in the groups having the disease caused by the feeding of DSS.

As for histologic scoring, the colon tissue was extracted from the mice, fixed with formalin, and subjected to hematoxylin and eosin (H&E) staining, to prepare a sample, and then the sample was observed to determine the histologic scoring index.

TABLE 5

| Day | PBS | L. sakei ($10^9$ CFU) | DSS + PBS | DSS + L. sakei ($10^7$ CFU) | DSS + L. sakei ($10^8$ CFU) | DSS + L. sakei ($10^9$ CFU) |
|---|---|---|---|---|---|---|
| Histologic scoring index | — | — | 4.40 | 3.05 | 2.51 | 2.21 |

Figure 6A:
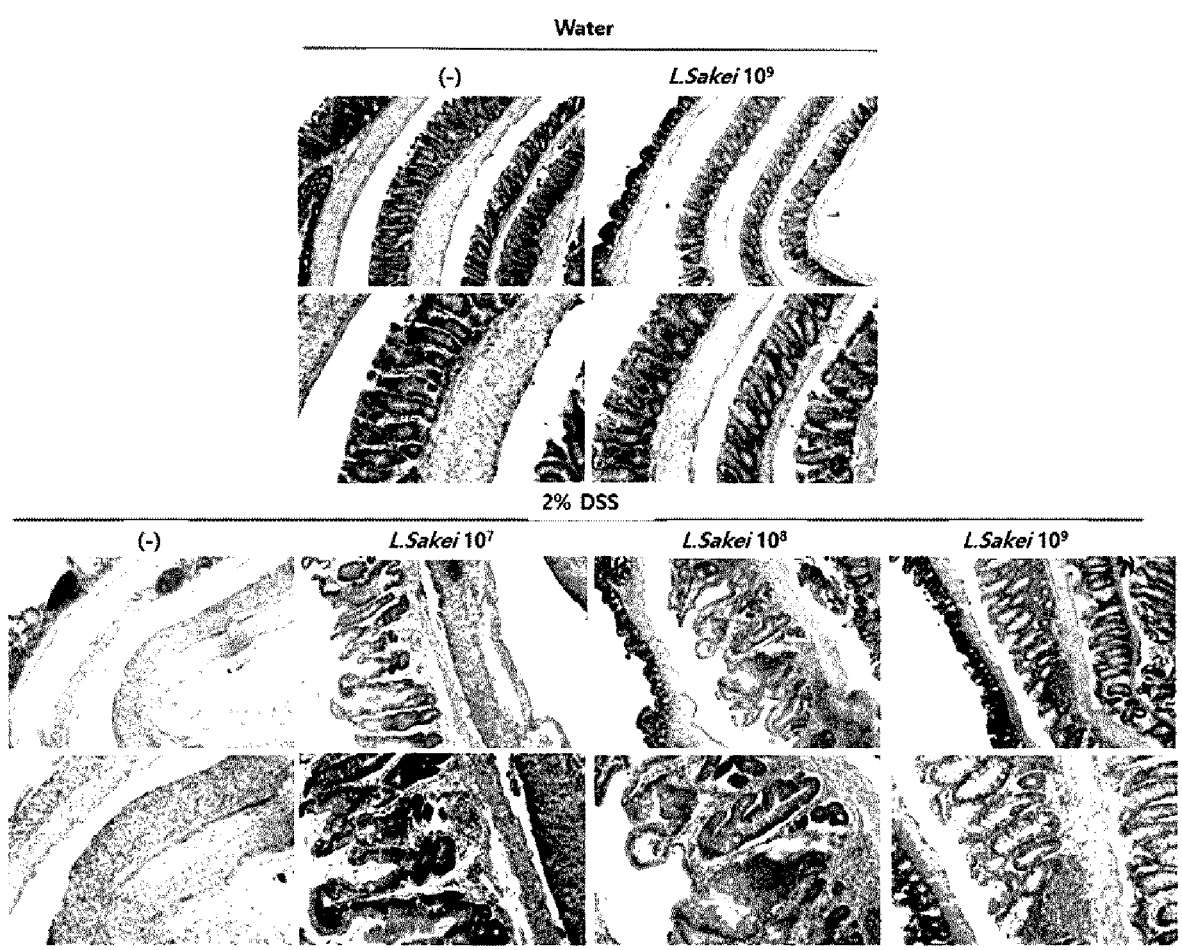
FIG. 6A shows hematoxylin and eosin (H&E) staining images of colon tissues by the feeding of *Lactobacillus sakei* CVL-001 strain in ulcerative colitis-induced mouse individuals.
Figure 6B:
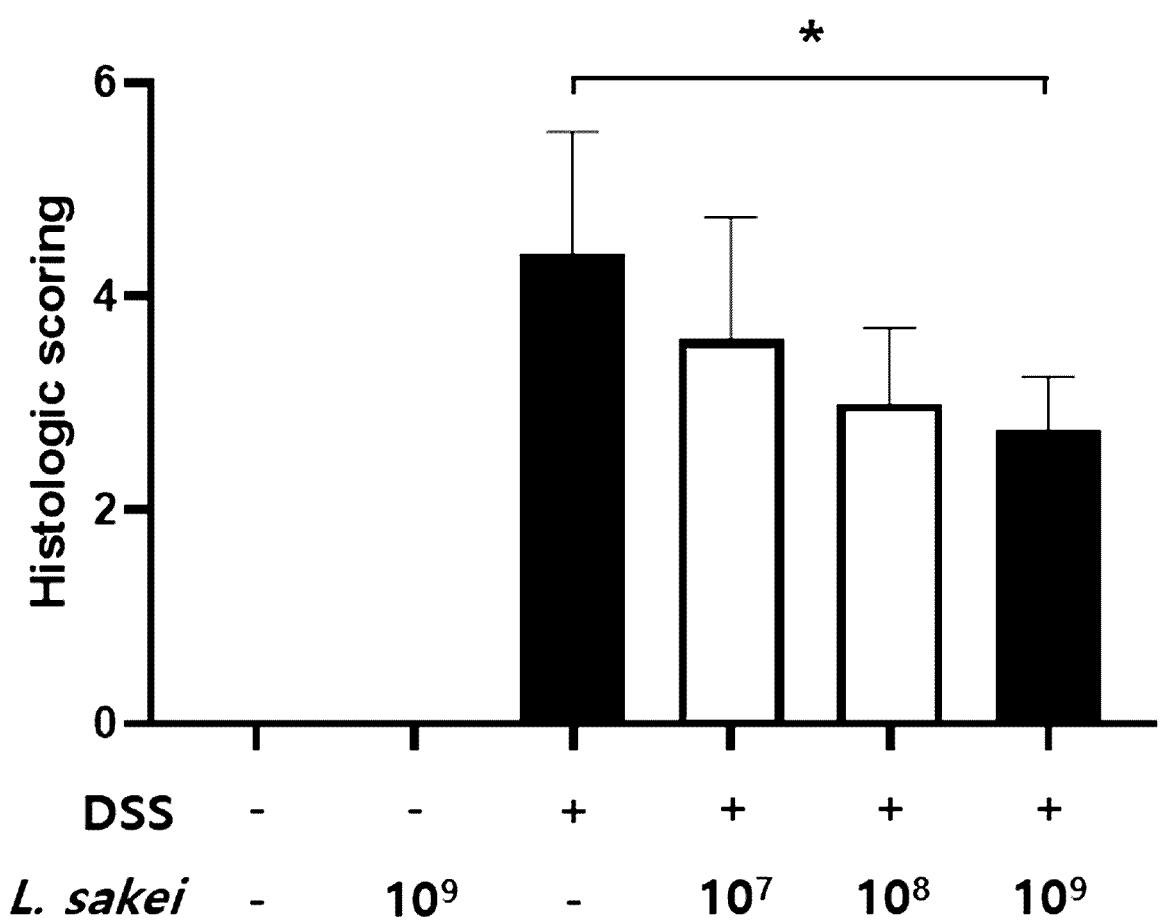
FIG. 6B is a graph showing colon tissue changes by the feeding of *Lactobacillus sakei* CVL-001 strain in ulcerative colitis-induced mouse individuals, as determined by histologic scoring using H&E staining.

As can be confirmed in Table 5 and FIGS. 6A and 6B, the histologic scoring index was recovered, considering the integrity of the epithelium and the reduction in inflammatory cell invasion in a concentration-dependent manner, in the groups administered the *Lactobacillus sakei* CVL-001 strain.

Example 5: Ulcerative Colitis Mouse Model Construction (2)

To determine what characteristics of the strain exhibit a protective effect on inflammatory bowel disease, heat-treated strains having only the characteristics of strain walls were prepared by heat killing (H.K.) of the *Lactobacillus sakei* CVL-001 strain through heat treatment. In addition, test groups were established by preparing the heat-treated strain from a culture containing strain metabolites and the culture excluding the strain while constructing the ulcerative colitis mouse model in the same manner as in Example 3.
  Group 1: water feeding (non-disease)+PBS
  Group 2: DSS feeding (disease)+PBS
  Group 3: DSS feeding+$10^9$ CFU *Lactobacillus sakei* CVL-001 strain (H.K.)
  Group 4: DSS feeding+*Lactobacillus sakei* CVL-001 culture The mice were acclimatized for 7 days, and then orally administered the heat-treated *Lactobacillus sakei* CVL-001 strain and the culture at 200 μl per mouse once a day for 10 days. The number of mice for each group was five or six. The rest of the procedure was carried out in the same manner as in Example 3.

Example 6: Protective Effects of Heat-Treated *Lactobacillus sakei* CVL-001 Strain and Culture on Ulcerative Colitis-Induced Mice 6-1. Changes in Body Weight and Disease Activity Index The ulcerative colitis-induced mice in Example 5 were administered the heat-treated *Lactobacillus sakei* CVL-001 strain and the culture and then measured for the weight change (unit: %) and DAI change, and as a result, the recovery of the mice was observed in only the group using the heat-treated strain.

TABLE 6

| Day | PBS | DSS + PBS | DSS + L. sakei ($10^9$ CFU) | DSS + L. sakei sup |
|---|---|---|---|---|
| 0 | — | — | — | — |
| 1 | 0.00 | 0.00 | 0.00 | 0.00 |
| 2 | 0.74 | −0.21 | −1.20 | −0.51 |
| 3 | 2.73 | 1.36 | 0.93 | 1.55 |
| 4 | 3.17 | 1.46 | 1.20 | 1.19 |
| 5 | 1.04 | −2.01 | −2.36 | −4.57 |
| 6 | 6.59 | −4.23 | −3.91 | −7.72 |
| 7 | 7.98 | −7.70 | −4.94 | −10.34 |
| 8 | 2.75 | −13.89 | −7.61 | −17.90 |
| 9 | 4.11 | −16.96 | −8.49 | −22.77 |
| 10 | 7.37 | −19.23 | −7.05 | −24.57 |
| 11 | 9.57 | −20.84 | −4.16 | −25.50 |
| 12 | 7.29 | −19.69 | −2.28 | −22.02 |

Figure 7:
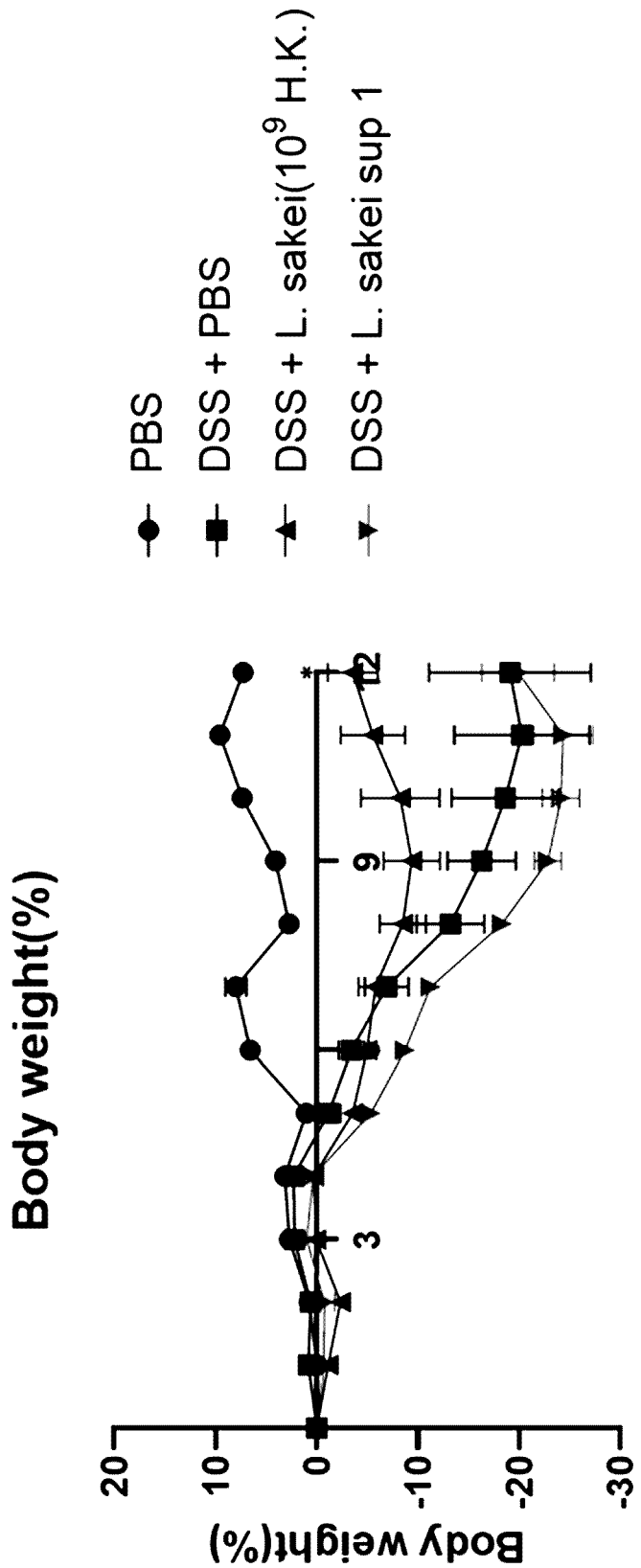
FIG. 7 is a graph showing body weight changes by the feeding of the heat-treated *Lactobacillus sakei* CVL-001 strain and the culture in ulcerative colitis-induced mouse individuals.

As can be confirmed in FIG. 7 and Table 6, the weight of the individual was recovered in the group fed with the lactic acid bacteria killed by heat treatment. Especially, the degree of weight loss by DSS was relatively reduced and the recovery rate was also significantly increased in the high-concentration administration group ($10^9$ CFU/mouse) compared with the other groups. The group treated with the culture showed no protective effect.

TABLE 7

| Day | PBS | DSS + PBS | DSS + L. sakei ($10^9$ CFU) | DSS + L. sakei sup |
|---|---|---|---|---|
| 0 | — | — | — | — |
| 1 | 0.00 | 0.00 | 0.00 | 0.00 |
| 2 | 0.00 | 0.00 | 0.00 | 0.00 |
| 3 | 0.00 | 0.00 | 0.00 | 0.00 |
| 4 | 0.00 | 2.90 | 2.50 | 2.83 |
| 5 | 0.00 | 6.40 | 3.42 | 6.25 |
| 6 | 0.00 | 6.80 | 3.75 | 9.67 |
| 7 | 0.00 | 7.80 | 3.50 | 7.33 |
| 8 | 0.00 | 5.50 | 3.42 | 6.17 |
| 9 | 0.00 | 5.20 | 3.00 | 5.83 |
| 10 | 0.00 | 5.00 | 2.08 | 5.50 |
| 11 | 0.00 | 3.80 | 1.42 | 4.83 |
| 12 | 0.00 | 2.10 | 0.67 | 3.50 |

Figure 8:
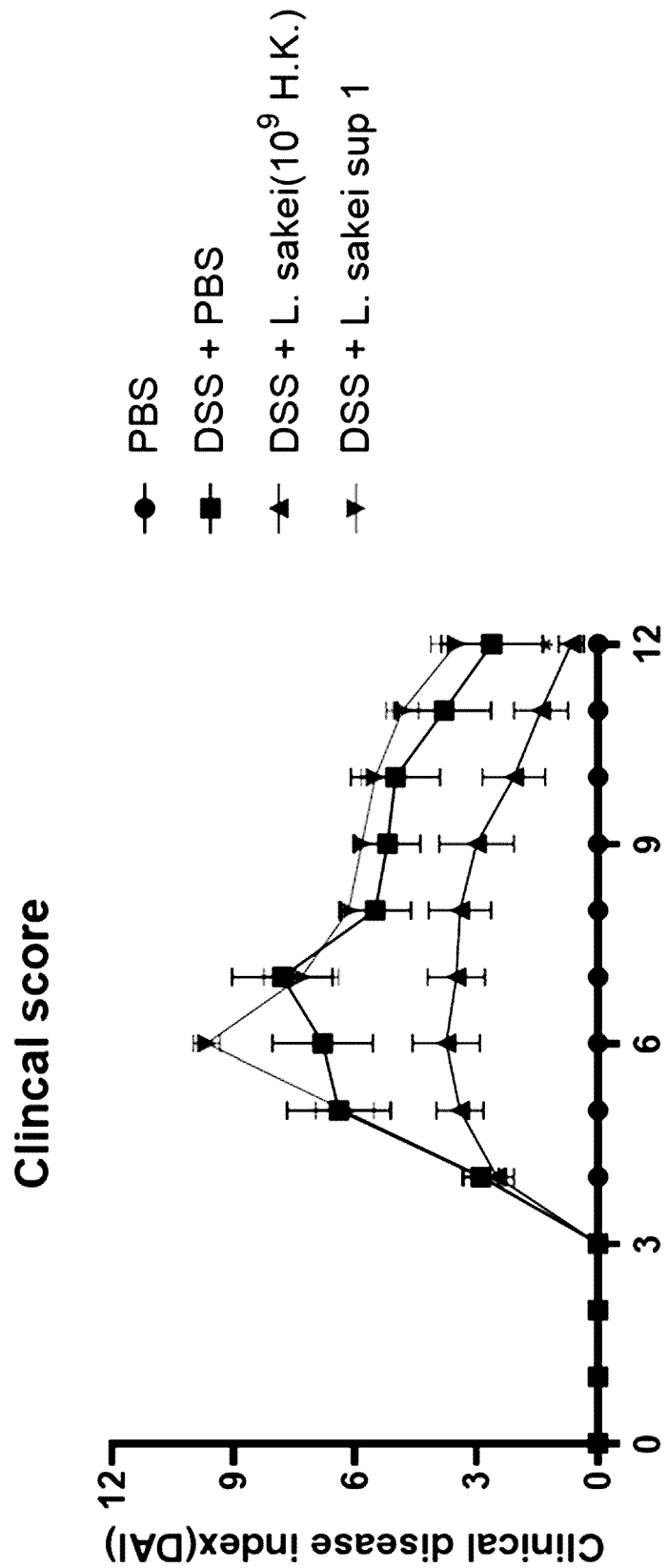
FIG. 8 is a graph showing DAI changes by the feeding of the heat-treated *Lactobacillus sakei* CVL-001 strain and the culture in ulcerative colitis-induced mouse individuals.

As can be confirmed in FIG. 8 and Table 7, the recovery of the mice was observed when the mice were administered the lactic acid bacteria killed by heat treatment and measured for the DAI change. The group treated with the culture showed no protective effect.

For the improvement of reproducibility and reliability, tests for weight and disease activity index were again carried out for only the heat-treated *Lactobacillus sakei* CVL-001 strain low concentration ($10^7$ CFU) and high concentration ($10^9$ CFU) groups, with the exclusion of the culture treatment group, in the test groups established in Example 5.

The mice were acclimatized for 7 days, and then orally administered the heat-treated *Lactobacillus sakei* CVL-001 strain at 200 μl per mouse once a day for 10 days. The number of mice for each group was nine. The rest of the procedure was carried out in the same manner as in Example 3.

TABLE 8

| Day | PBS | DSS + PBS | DSS + L. sakei ($10^7$ CFU; HK) | DSS + L. sakei ($10^9$ CFU; HK) |
|---|---|---|---|---|
| 0 | — | — | — | — |
| 1 | −0.43 | −0.38 | −0.45 | 0.36 |
| 2 | 0.01 | −0.26 | 0.60 | 0.19 |
| 3 | −0.59 | −0.78 | 0.42 | −0.51 |
| 4 | 0.75 | −0.56 | −0.48 | −0.96 |
| 5 | 0.80 | −3.59 | −3.95 | −2.79 |
| 6 | 1.59 | −10.97 | −8.68 | −4.84 |
| 7 | 1.93 | −17.28 | −13.05 | −7.36 |
| 8 | 1.55 | −21.54 | −14.59 | −7.43 |
| 9 | 2.17 | −24.35 | −14.96 | −4.92 |
| 10 | 1.71 | −25.42 | −12.66 | 0.45 |
| 11 | 5.14 | −24.08 | −8.21 | 2.48 |

Figure 9:
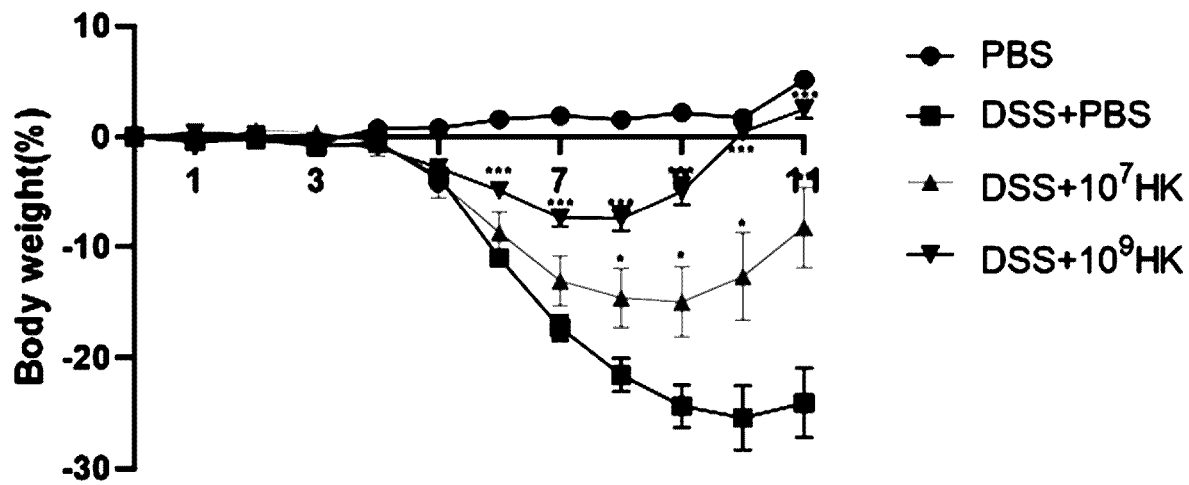
FIG. 9 is a graph showing body weight changes by the feeding of heat-treated *Lactobacillus sakei* CVL-001 strain in ulcerative colitis-induced mouse individuals.

As can be confirmed in FIG. 9 and Table 8, the weight of the individuals was recovered in a concentration-dependent manner in the groups fed with the lactic acid bacteria killed by heat treatment. Especially, the degree of weight loss by DSS was relatively reduced and the recovery rate was also significantly increased in the high-concentration administration group ($10^9$ CFU/mouse) compared with the other groups.

TABLE 9

| Day | PBS | DSS + PBS | DSS + L. sakei ($10^7$ CFU; HK) | DSS + L. sakei ($10^9$ CFU; HK) |
|---|---|---|---|---|
| 0 | — | — | — | — |
| 1 | 0.00 | 0.00 | 0.00 | 0.00 |
| 2 | 0.00 | 0.00 | 0.00 | 0.00 |
| 3 | 0.00 | 0.00 | 0.00 | 0.00 |
| 4 | 0.00 | 1.94 | 2.39 | 2.06 |
| 5 | 0.00 | 3.83 | 4.06 | 2.56 |
| 6 | 0.00 | 7.67 | 6.22 | 4.89 |
| 7 | 0.00 | 7.83 | 5.44 | 4.28 |
| 8 | 0.00 | 6.78 | 4.44 | 3.11 |
| 9 | 0.00 | 5.67 | 3.67 | 3.17 |
| 10 | 0.00 | 5.28 | 3.50 | 1.39 |
| 11 | 0.00 | 5.11 | 3.06 | 0.56 |

Figure 10:
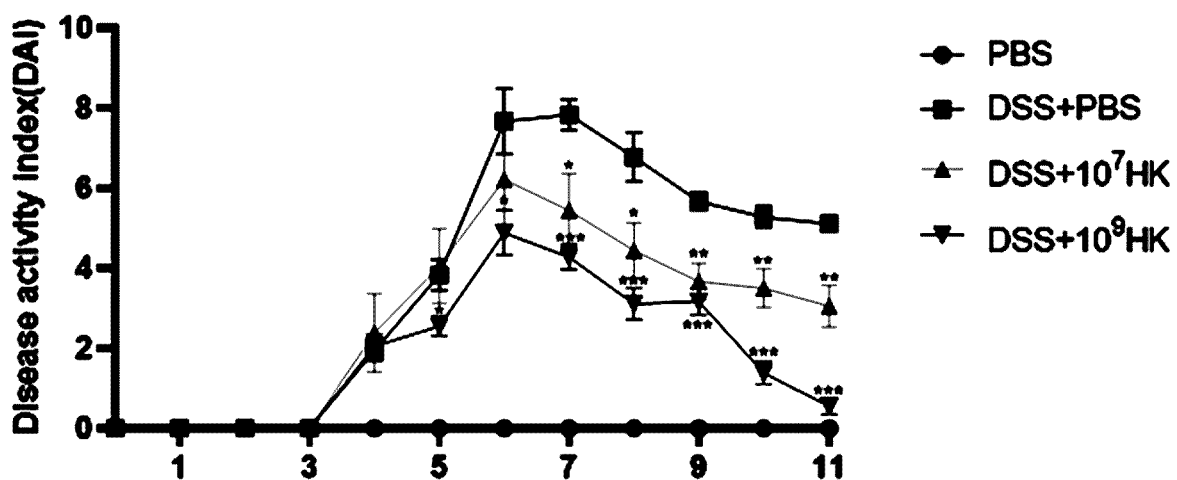
FIG. 10 is a graph showing DAI changes by the feeding of heat-treated *Lactobacillus sakei* CVL-001 strain in ulcerative colitis-induced mouse individuals.

As can be confirmed in FIG. 10 and Table 9, the mice were recovered in a concentration-dependent manner when the mice were administered the lactic acid bacteria killed by heat treatment and measured for the DAI change. Especially, the clinical symptoms by DSS were relatively reduced and the recovery rate was also significantly increased in the high-concentration administration group ($10^9$ CFU/mouse) compared with the other groups.

6-2. Changes in Colon Length and Histologic Scoring Index Recovery

The groups administered the lactic acid bacteria were measured for colon length and investigated the change in histologic scoring index by examination of the epithelium integrity and inflammatory cell invasion.

TABLE 10

| day | PBS | DSS + PBS | DSS + L. sakei ($10^7$ CFU; HK) | DSS + L. sakei ($10^9$ CFU; HK) |
|---|---|---|---|---|
| Colon length (mm) | 78.44 | 51.56 | 59.11 | 70.33 |

Figure 11:
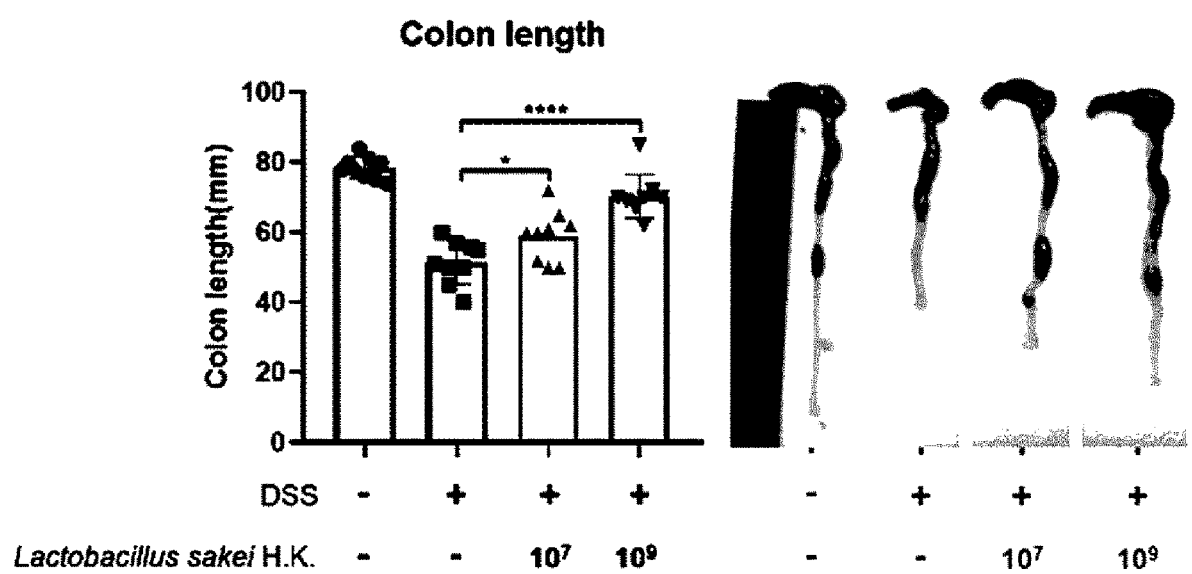
FIG. 11 is a graph showing colon length changes by the feeding of heat-treated *Lactobacillus sakei* CVL-001 strain in ulcerative colitis-induced mouse individuals.

As can be confirmed in Table 10 and FIG. 11, the colon length was recovered in a concentration-dependent manner in the groups administered the *Lactobacillus sakei* CVL-001 strain among the groups having the disease caused by the feeding of DSS.

TABLE 11

| Day | PBS | DSS + PBS | DSS + L. sakei ($10^7$ CFU; HK) | DSS + L. sakei ($10^9$ CFU; HK) |
|---|---|---|---|---|
| Histologic scoring index | 0.00 | 4.88 | 3.70 | 1.60 |

Figure 12A:
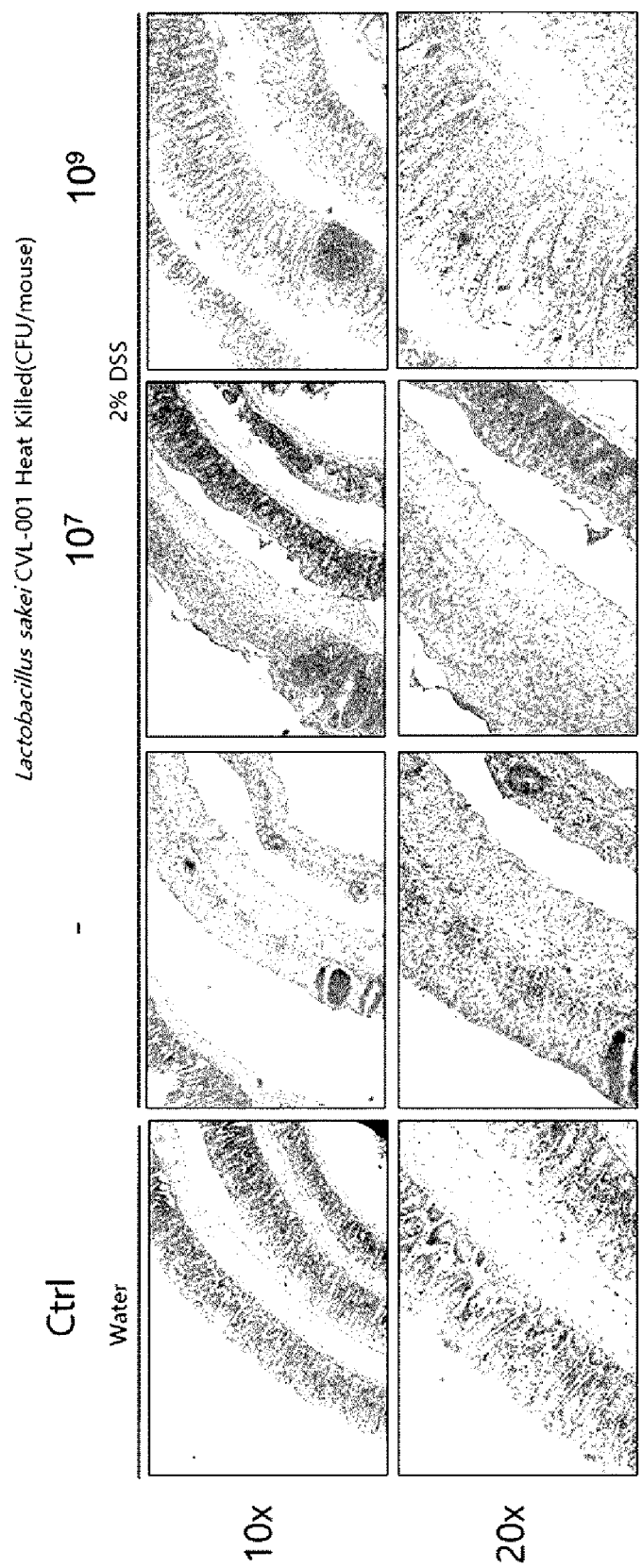
FIG. 12A shows H&E staining images of colon tissues by the feeding of heat-treated *Lactobacillus sakei* CVL-001 strain in ulcerative colitis-induced mouse individuals.
Figure 12B:
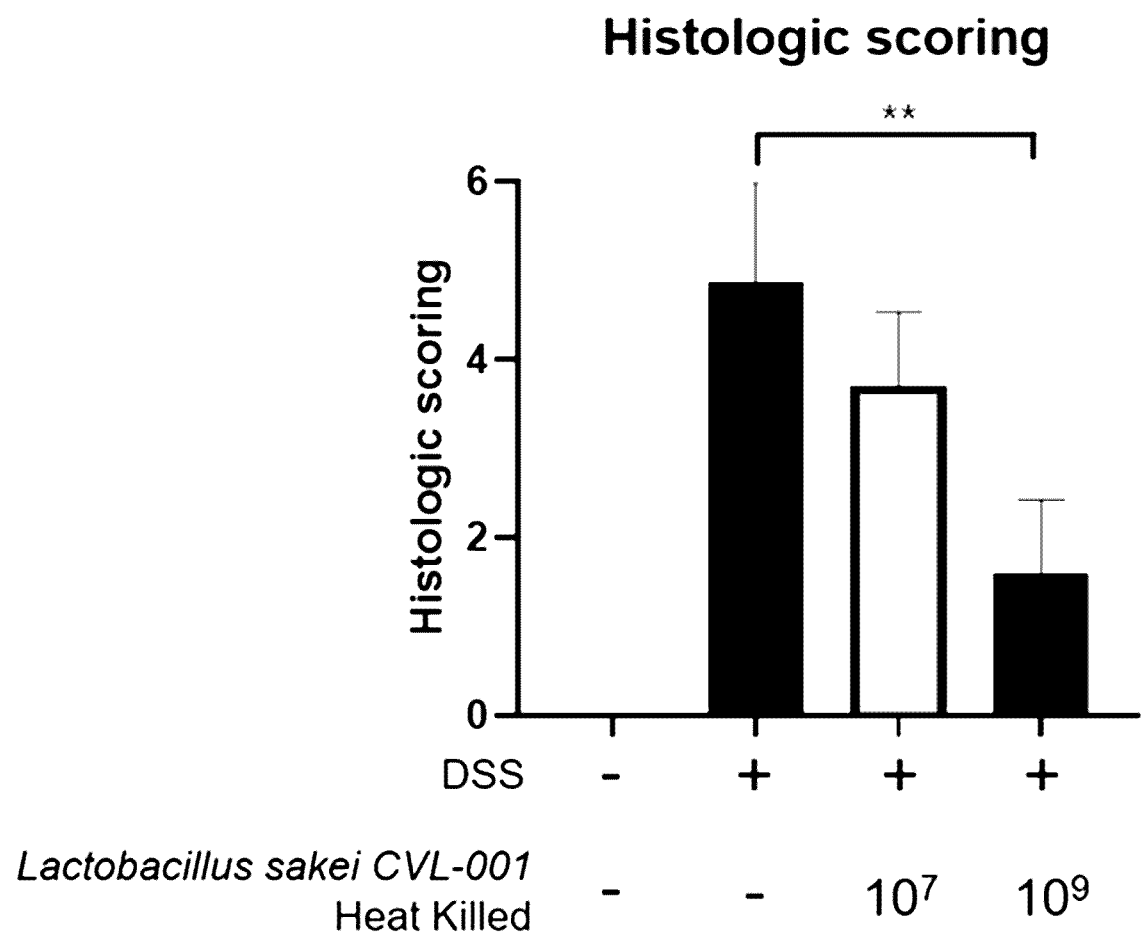
FIG. 12B is a graph showing colon tissue changes by the feeding of heat-treated *Lactobacillus sakei* CVL-001 strain in ulcerative colitis-induced mouse individuals, as determined by histologic scoring using H&E staining.

As can be confirmed from Table 11 and FIGS. 12A and 12B, the histologic scoring index was recovered in a concentration-dependent manner, considering the integrity of the intestinal epithelium and the reduction in inflammatory cell invasion, in the groups administered the *Lactobacillus sakei* CVL-001 strain.

INDUSTRIAL APPLICABILITY

The present disclosure relates to a composition containing *Lactobacillus sakei* CVL-001 strain for preventing or treating an inflammatory disease and, more specifically, to a composition capable of exhibiting activity to prevent, treat, or alleviate an inflammatory disease by using *Lactobacillus sakei* CVL-001 strain.

What is claimed is:

1. A method for alleviating or treating an inflammatory disease, the method comprising:
   administering to a subject in need thereof a composition comprising an effective amount of a *Lactobacillus sakei* CVL-001 strain deposited under accession number KCTC 13816BP,
   wherein the strain is an inactivated form obtained by killing with heat,
   wherein the composition comprises the strain at a concentration of $5 \times 10^9$ CFU/ml.

2. The method of claim 1, wherein the inflammatory disease is at least one selected from the group consisting of ulcerative colitis, ulcerative duodenitis, Crohn's disease, irritable bowel syndrome, intestinal Behcet's disease, hemorrhagic rectal ulcer, pouchitis, enteritis, ischemic colitis, extra-intestinal manifestations, dermatitis, atopic dermatitis, asthma, conjunctivitis, periodontitis, rhinitis, otitis media, iritis, pharyngitis, tonsillitis, pneumonia, pancreatitis, gastritis, hemorrhoids, gout, ankylosing spondylitis, lupus, fibromyalgia, psoriasis, rheumatoid arthritis, osteoarthritis, osteoporosis, hepatitis, cystitis, nephritis, Sjogren's syndrome, and multiple sclerosis.

3. The method of claim 1, wherein the composition comprises a pharmaceutically acceptable carrier which is selected from the group comprising lactose, dextrose, sucrose, sorbitol, mannitol, starch, acacia gum, calcium phosphate, alginate, gelatin, calcium silicate, microcrystalline cellulose, polyvinylpyrrolidone, cellulose, water, syrup, methyl cellulose, methyl hydroxybenzoate, propyl hydroxybenzoate, talc, magnesium stearate, and mineral oils.

4. The method of claim 3, wherein the composition further comprises a lubricant, a wetting agent, a sweetening agent, a flavoring agent, an emulsifier, a suspending agent, and a preservative.

* * * * *